July 5, 1966 C. E. FISHER 3,259,258
LOADER MECHANISM FOR MATERIAL HANDLING VEHICLES
Filed Jan. 13, 1965 3 Sheets-Sheet 1

INVENTOR
CHARLES E. FISHER
BY
ATTORNEYS

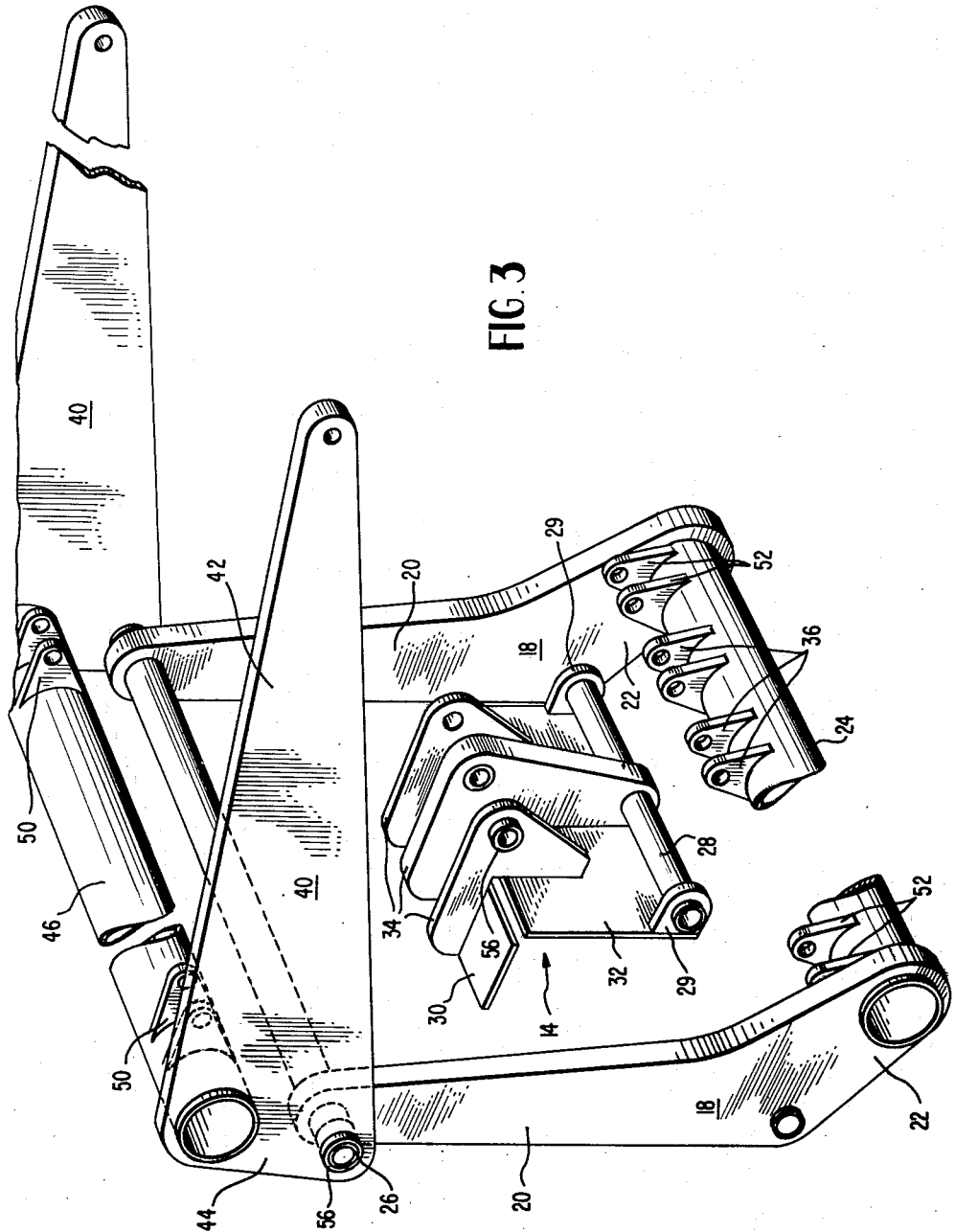

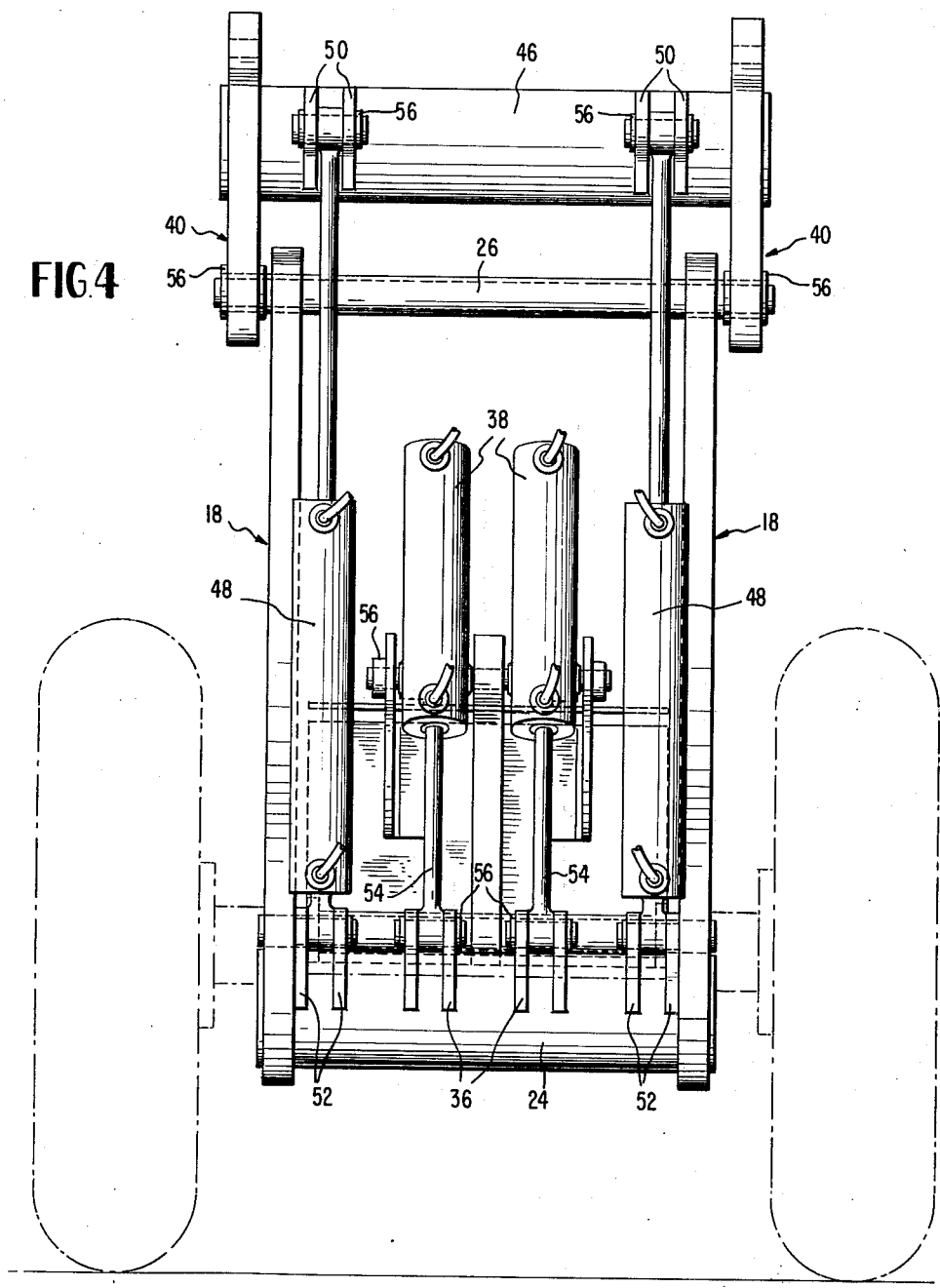

United States Patent Office 3,259,258
Patented July 5, 1966

3,259,258
LOADER MECHANISM FOR MATERIAL
HANDLING VEHICLES
Charles E. Fisher, N. Fork Road, Columbia Falls, Mont.
Filed Jan. 13, 1965, Ser. No. 425,130
7 Claims. (Cl. 214—130)

The present invention relates to material handling equipment, and more specifically to a hydraulically operated loader mechanism for use on vehicles such as logging tractors and the like.

It is often necessary to equip various types of material handling vehicles, such as logging tractors, with loading equipment for loading various material or equipment on a truck or a loading platform. Loading equipment which has heretofore been available, however, either has not been designed to permit accurate loading operations, or has included large framework which extends the full length of the carrying vehicles. The latter type of loading equipment is not only bulky and awkward, but is completely unsuitable for articulated frame vehicles such as some types of logging tractors.

In view of the foregoing, it is an object of the present invention to provide a loading mechanism which is relatively compact, yet which performs loading operations with greater accuracy than could be accomplished with loaders which have heretofore been available.

It is a further object of this invention to provide a loading mechanism especially suitable for use with material handling vehicles which is designed to provide a high reach and a low retracted height to permit material handling operations in low clearance areas that would be inaccessible by a conventional mast type loader.

Other objects of the invention will be pointed out in the following description and claims and illustrated in the accompanying drawings, which disclosed, by way of example, the principle of the invention and the best mode which has been contemplated of applying that principle.

In the drawings:

FIGURE 3 is a perspective view of the loading mechanism; and

FIGURE 4 is a front elevation view of the loading mechanism mounted on a wheeled vehicle.

Figure 1:
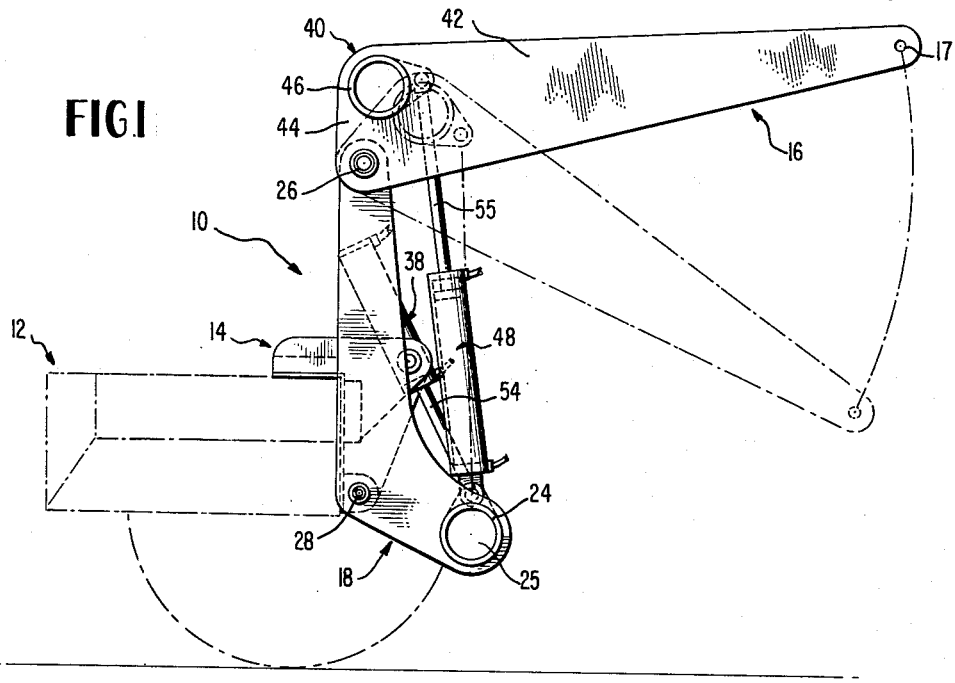
FIGURE 1 is a side elevation view of the loading mechanism of the present invention mounted on a wheeled vehicle.

Referring now to the drawings, the loading mechanism of the present invention comprises a tilting member 10 pivotally mounted on a wheeled vehicle 12 by means of a mounting frame 14. Pivotally secured at the upper end of the tilting member 10 is a loader member 16 which may be adapted to carry a suitable fork, grapple, bucket or other material handling device (not shown) at its outer end 17.

The tilting member 10 may include a pair of substantially parallel pivotable tilting elements 18, each of which includes two integrally connected rigid arms 20, 22 extending at an angle with respect to one another. The tilting elements 18 may be connected to one another at the outer end of the arms 22 by means of a tubular connecting member 24 which has its ends fixedly secured in holes 25 in arms 22. An upper pivot rod or tube 26 extends through holes in the outer ends of the arms 20 of the tilting elements 18, and a lower pivot rod or tube 28 extends through holes which are provided in the tilting elements 18 in an area substantially at the juncture of the arms 20 and 22. The tube 26 is fixedly secured in the holes in the tilting elements 18, and as best shown in FIGURE 3, the lower pivot tube 28 is secured to the mounting frame 14 intermediate its ends.

The mounting frame 14 includes plates 30, 32 (FIGURE 3) which are welded or otherwise suitably secured to the vehicle 12. Mounting brackets 34, 34 and 36, 36 are suitably secured on the plates 30, 32 and on the connecting member 24, respectively, for mounting the ends of power means, such as hydraulic cylinders 38, see FIGURE 4.

The hydraulic cylinders 38 which extend between the mounting frame and the connecting member 24 may be selectively extended or retracted to cause the tilting member 10 to pivot about the lower pivot tube 28. Although two hydraulic cylinders 38 are shown (see FIGURE 4), it is contemplated that any desired number of any suitable power means may be employed to pivot the tilting member.

The loader member 16 includes a pair of substantially parallel pivotable loader elements 40, each of which include integrally connected rigid arms 42, 44 which extend at an angle with respect to one another. The loader elements 40 may be connected to one another by means of a tubular connecting member 46 which has each of its ends connected to one of the elements in an area substantially at the juncture of the arms 42, 44. The outer ends of the arms 44 are pivotally mounted on the upper pivot tube 26 so that the loader member can pivot relative to the tilting member 10.

Although the upper pivot tube 26 has been shown as being fixedly secured in holes in the tilting elements 18 and rotatably mounted in the holes in the loader elements (see FIGURE 3), it could be fixedly secured in the holes of the loader elements and rotatably secured in the holes of the tilting element. The important feature is that the loader member be able to pivot relative to the tilting member about the center line of the upper pivot tube. Similarly, the lower pivot tube 28 may be fixedly secured in the holes in flanges 29 of the mounting frame structure 14 and rotatably mounted in the holes in the tilting elements 18 as shown in FIGURE 3, or it may be fixedly secured in the holes in the tilting elements 18 and rotatably mounted in the holes of the flanges 29. The important feature is that the tilting member be able to pivot relative to the mounting frame structure about the center line of the lower pivot tube 28.

A suitable power means such as a pair of hydraulic cylinders 48 may be disposed between the connecting members 26 and 46 for causing the loader member to pivot relative to the tilting member, see FIGURE 4. Accordingly, the connecting member 46 may be provided with brackets 50, and the connecting member 24 may be provided with brackets 52 for mounting the ends of the hydraulic cylinders 48.

Although the pivotable elements 18 of the tilting member 10 have been illustrated as being substantially L-shaped, arm 20 being longer than arm 22, and the pivotable elements 40 of the loader member 16 have been shown as being substantially triangular in shape, either or both of these elements may be triangular or L-shaped. It has been found, however, that a greater range of movement of the tilting and loader members may be realized if the elements each have a long and short arm which are connected as shown. However, the precise shapes of these pivotable elements and placement of the cylinders may be varied in accordance with the desired range of movement of the tilting and loading members.

Suitable bushings 56 may be employed between the pivot tube 26 and the peripheral walls of the holes in the loader elements 40 through which the tube extends, and also between the ends of the hydraulic cylinders 38, 48 and the peripheral walls of the holes in the brackets 34, 36, 50, 52 through which they extend to reduce wear between these parts.

In operation, when rod 54 of the hydraulic cylinder 38 is extended, the tilting member 10 will be rotated in a clockwise direction (as viewed in FIGURES 1 and 2) to move the loading member 16 to its outermost position (see FIGURE 1). When the rod 54 is retracted it will rotate the tilting member 10 in a counterclockwise direction to move the loader member 16 to its innermost position (see FIGURE 2).

Figure 2:
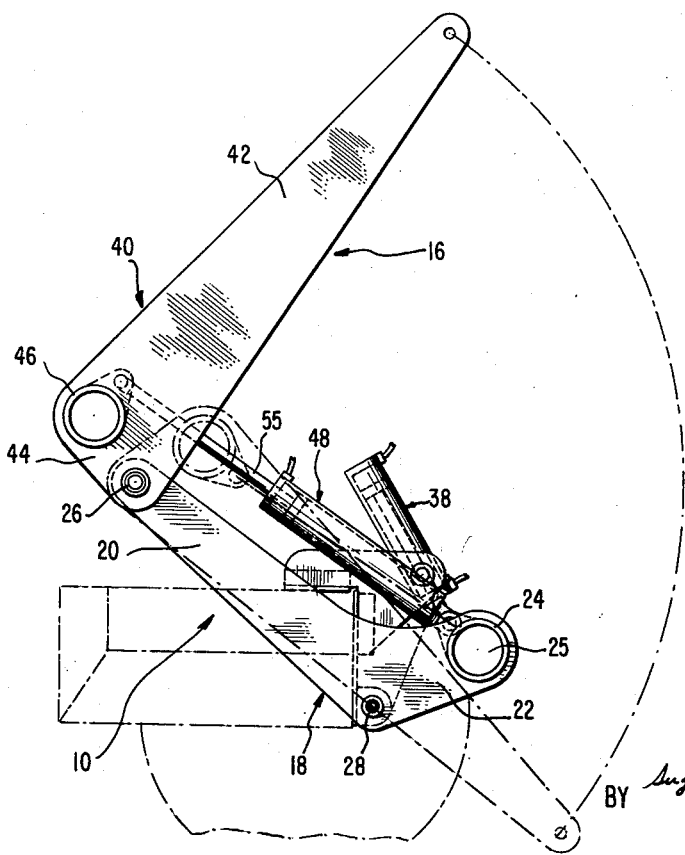
FIGURE 2 is a side elevation view similar to FIGURE 1 showing the loading mechanism in a different position.

Extension of rod 55 of cylinder 48 will pivot the loader member 16 in a counterclockwise direction, relative to the tilting member 10, to its high-level position shown in solid lines in FIGURES 1 and 2. As the rod 55 is retracted it will rotate the loader member 16 in a clockwise direction (as viewed in FIGURES 1 and 2) through an intermediate level position shown in phantom lines in FIGURE 1, to its low-level or retractive position shown in phantom lines in FIGURE 2. Thus, by selectively actuating either or both of the cylinders 38 and 48, a relatively large range of movement of the loader mechanism may be realized.

As can be seen from the foregoing, the loader mechanism of the present invention has a relatively large range of movement, thus permitting loading operations to be conducted with a relatively high degree of accuracy. Yet the loading mechanism is relatively compact and may be mounted on the edge of a vehicle or the like.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. For example, a single tilting element and loader element may be employed in certain instances, instead of connected pairs of each. It is the intention, therefore, to be limited only as indicated by the scope of the following claims.

What is claimed is:

1. A loader mechanism comprising: a mounting frame structure adapted to be secured to a material handling vehicle; a tilting member including two substantially parallel tilting elements; each of said tilting elements including a first arm and a second arm integrally connected and extending at an angle with respect to one another, a tilting elements connecting member extending between and connecting the outer ends of said first arms of said tilting elements; a lower pivot tube extending between said tilting elements at substantially the juncture of the first and second arms thereof; said lower pivot tube being connected to said mounting frame structure; a loader member including two substantially parallel loader elements pivotally connected to said tilting member; a first power means connected between said mounting frame structure and said tilting elements connecting member for pivoting said tilting member about said lower pivot tube; and a second power means connected between said tilting member and said loader member for pivoting said loader member relative to said tilting member.

2. A loader mechanism as claimed in claim 1, wherein said first and second power means each include at least one fluid-operated cylinder.

3. A loader mechanism as claimed in claim 2, wherein: said second arm of each of said tilting elements is longer than said first arm, an upper pivot tube extends between the outer ends of said longer arms of said tilting elements, and the loader member is connected to said upper pivot tube for pivotal movement relative to said tilting member.

4. A loader mechanism as claimed in claim 3, wherein: the loader elements of said loader member each include a long arm and a short arm integrally connected and extending at an angle with respect to one another, a loader elements connecting member extends between and connects said loader elements at substantially the juncture of the long and short arms of said loader elements, and the loader member is connected to said upper pivot tube at the outer ends of each of said short arms of said loader elements.

5. A loader mechanism as claimed in claim 4, wherein the fluid operated cylinder of said second power means is connected between said tilting elements connecting member and said loader elements connecting member for pivoting said loader member relative to said tilting member.

6. A loader mechanism comprising: a mounting frame structure adapted to be secured to a material handling vehicle; a tilting member including two substantially parallel tilting elements; said tilting elements each including a short arm and a long arm integrally connected and extending at an angle with respect to one another; a tilting elements connecting member extending between and connecting the outer ends of said short arms of said tilting elements; a lower pivot tube extending between said tilting elements at substantially the juncture of said long and said short arms thereof; said lower pivot tube being connected to said mounting frame structure; bracket means on said mounting frame structure and said tilting elements connecting member; a first pair of hydraulic cylinders connected between the bracket means on said mounting frame structure and the bracket means on said tilting elements connecting member for pivoting said tilting member about said lower pivot tube; a loader member including two substantially parallel loader elements; each of said loader elements comprising a long arm and a short arm integrally connected and extending at an angle with respect to one another; a loader elements connecting member extending between and connecting said loader elements at substantially the juncture of the long and short arms thereof; bracket means disposed on said loader elements connecting member; an upper pivot tube extending between the outer ends of the long arms of said tilting elements; said loader member being connected to said upper pivot tube at the outer ends of said short arms of said loader elements for pivotal movement relative to said tilting member; and a second pair of hydraulic cylinders connected between said bracket means on said tilting elements connecting member and said bracket means on said loader elements connecting member for pivoting said loader member relative to said tilting member.

7. A loader mechanism comprising; a mounting frame structure, a tilting element, the tilting element including a long arm and a short arm integrally connected and extending at an angle with respect to one another, means pivotally connecting the tilting element to the mounting frame structure at a pivot point substantially at the juncture of the long and short arms of the tilting element, a loader element including a long arm and a short arm integrally connected and extending at an angle with respect to one another, means pivotally connecting the loader element to the tilting element at a pivot point near the outer end of the long arm of the tilting element and at the outer end of the short arm of the loader element, a first fluid-operated power cylinder connected between the mounting frame structure and the outer end of the shorter arm of the tilting element for pivoting the tilting element about its pivot, and a second fluid-operated power cylinder connected between the outer end of the shorter arm of the tilting element at a point near the juncture of the arms of the loading element for pivoting the loading element about its pivot on the tilting element.

References Cited by the Examiner
UNITED STATES PATENTS

| | | | |
|---|---|---|---|
| 2,820,555 | 1/1958 | Lessmann | 214—140 |
| 2,926,796 | 3/1960 | Martinson | 214—130 X |
| 2,949,199 | 8/1960 | Jones | 214—78 X |
| 2,989,199 | 6/1961 | Hough et al. | 214—140 |

HUGO O. SCHULZ, *Primary Examiner.*